(12) United States Patent
Chapus et al.

(10) Patent No.: US 8,962,905 B2
(45) Date of Patent: *Feb. 24, 2015

(54) PROCESS FOR THE CONTINUOUS HYDROGENATION OF TRIGLYCERIDE CONTAINING RAW MATERIALS USING A NICKEL AND MOLYBDENUM-BASED CATALYST

(75) Inventors: Thierry Chapus, Lyons (FR); Nathalie Dupassieux, Lyons (FR); Antoine Daudin, Corbas (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 275 days.

This patent is subject to a terminal disclaimer.

(21) Appl. No.: 13/226,524

(22) Filed: Sep. 7, 2011

(65) Prior Publication Data
US 2012/0059209 A1 Mar. 8, 2012

(30) Foreign Application Priority Data
Sep. 8, 2010 (EP) .................................... 10290480

(51) Int. Cl.
*C10G 3/00* (2006.01)
*C10L 1/08* (2006.01)

(52) U.S. Cl.
CPC .. *C10G 3/60* (2013.01); *C10G 3/50* (2013.01); *C10G 3/54* (2013.01); *C10L 1/08* (2013.01);
(Continued)

(58) Field of Classification Search
USPC ......... 585/240, 263, 265, 271, 733, 701, 242, 585/315, 250, 269, 270, 273–276, 585/638–640; 208/142, 143, 57; 502/208, 502/210, 211, 213, 300, 305, 313, 315
See application file for complete search history.

(56) References Cited

U.S. PATENT DOCUMENTS 3,755,148 A * 8/1973 Mickelson ..................... 208/143
4,740,295 A * 4/1988 Bearden et al. ............... 208/421
(Continued)

FOREIGN PATENT DOCUMENTS

WO    WO 2007/125332 A1    11/2007

OTHER PUBLICATIONS

G. F. Froment, B. Delmon, and P. Grange, "Hydrotreatment and Hydrocracking of Oil Fractions," Nov. 3, 1999, Elsevier, p. 267.*
(Continued)

*Primary Examiner* — In Suk Bullock
*Assistant Examiner* — Philip Louie
(74) *Attorney, Agent, or Firm* — Millen, White, Zelano & Branigan, P.C.

(57) ABSTRACT

Process for the continuous hydrogenation of triglyceride containing raw materials in a fixed bed reactor system having several catalyst beds arranged in series and comprising at least one hydrogenation catalyst comprising an active phase constituted by a nickel and molybdenum element. The raw material feed, hydrogen containing gas and diluting agent are passed together through the catalyst beds at hydrogenation conditions. The raw material feed stream as well as the stream of hydrogen containing gas are divided into an equal number of different partial streams. These are each passed to one catalyst bed in such a manner that the weight ratio of diluting agent to raw material feed is essentially the same at the entrance of all catalyst beds and does not exceed 4:1. The claimed process is preferably conducted at low temperatures and allows the utilization of existing units due to the low recycle ratio.

12 Claims, 1 Drawing Sheet

(52) U.S. Cl.
CPC .............. *C10G 3/46* (2013.01); *C10G 2400/04* (2013.01); *C10G 2400/08* (2013.01); *Y02E 50/13* (2013.01); *C10G 2300/4018* (2013.01); *C10G 2300/1014* (2013.01); *C10G 2300/802* (2013.01)
USPC ........... 585/733; 585/240; 585/242; 585/315; 585/250; 585/265; 585/269; 585/270; 585/271; 585/273; 585/274; 585/275; 585/276; 585/638; 585/639; 585/640; 502/208; 502/210; 502/211; 502/213; 502/300; 502/305; 502/313; 502/315

(56) References Cited

U.S. PATENT DOCUMENTS

| | | | |
|---|---|---|---|
| 6,299,759 B1 * | 10/2001 | Bradway et al. | 208/59 |
| 7,232,935 B2 * | 6/2007 | Jakkula et al. | 585/240 |
| 7,425,657 B1 * | 9/2008 | Elliott et al. | 568/667 |
| 7,511,181 B2 * | 3/2009 | Petri et al. | 585/240 |
| 2004/0230085 A1 * | 11/2004 | Jakkula et al. | 585/240 |
| 2008/0161614 A1 * | 7/2008 | Bertoncini et al. | 585/240 |
| 2009/0247799 A1 * | 10/2009 | Myllyoja et al. | 585/240 |
| 2009/0299109 A1 * | 12/2009 | Gruber et al. | 585/14 |
| 2009/0301932 A1 | 12/2009 | Roberto Gomes et al. | |
| 2009/0318737 A1 | 12/2009 | Luebke | |
| 2009/0326285 A1 | 12/2009 | Bauer et al. | |
| 2010/0043279 A1 * | 2/2010 | Abhari et al. | 44/308 |

OTHER PUBLICATIONS

Klaus-Dieter Henkel, "Reactor Types and Their Industrial Appleations," Jun. 15, 2000, Wiley-VCH, p. 298.*
Search Report of EP 10290480 (Feb. 3, 2011).

* cited by examiner

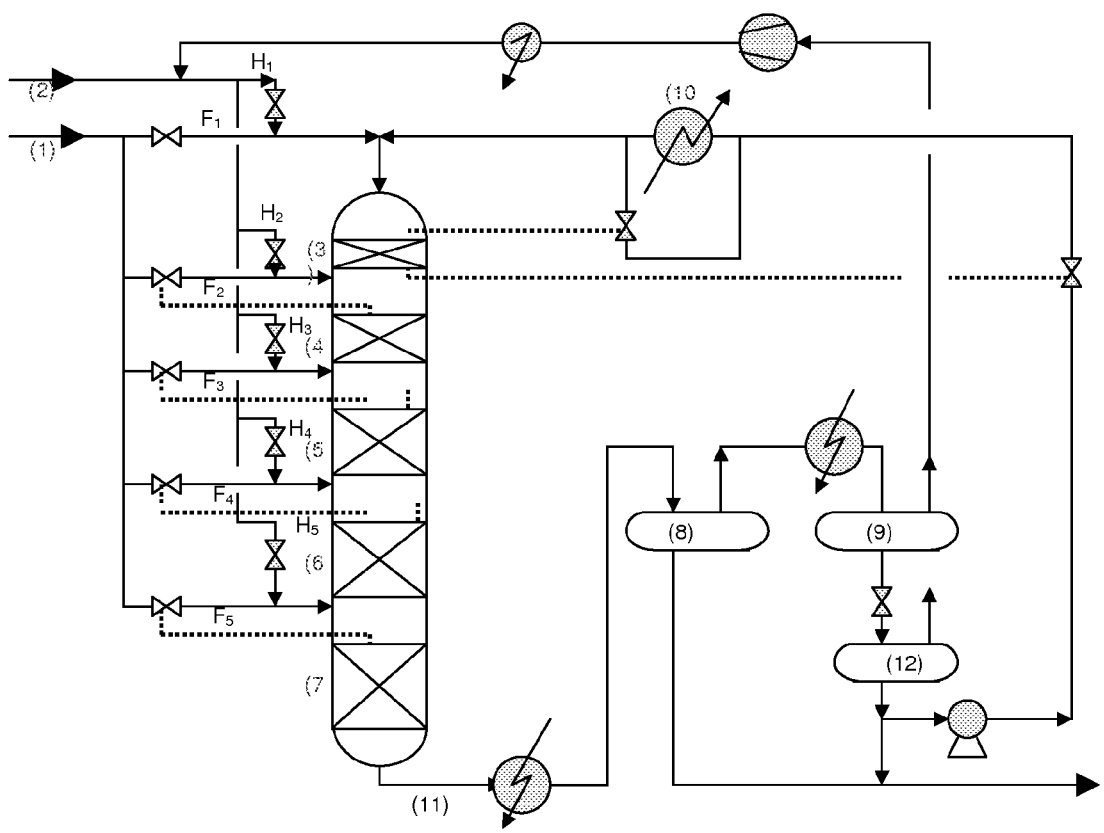

PROCESS FOR THE CONTINUOUS HYDROGENATION OF TRIGLYCERIDE CONTAINING RAW MATERIALS USING A NICKEL AND MOLYBDENUM-BASED CATALYST

SUMMARY

The invention relates to an improved process for the continuous hydrogenation of triglyceride containing raw materials like vegetable oils in a fixed bed reactor system having several catalyst beds comprising specific hydrogenation catalysts.

BACKGROUND OF PRIOR ART

The use of renewable sources like vegetable oils in fuel production is steadily increasing. Since neat oils and fats of biological origin display inferior properties, there have been a considerable number of proposals for converting such materials into more satisfactory fuel products. A comprehensive overview of the prior art, which is hereby included by reference, is provided in EP 1 741 768 A1.

One possibility for improvement is the catalytic hydrotreating of animal and vegetable oils and fats to produce saturated hydrocarbons which e.g. may be useful as diesel and/or kerosene fuels. Such hydrotreating comprises the removal of unsaturations and the hydrodeoxygenation of the triglycerides. Due to the highly exothermic nature of these reactions, temperature control is very important to avoid undesirable side reactions. Such side reactions are further promoted by free fatty acids which are present in considerable amounts in animal and vegetable oils and fats. To mitigate these problems it is proposed in EP 1 741 768 A1 to subject such biological materials containing more than 5 weight % of free fatty acids to catalytic hydrotreating at a reaction temperature of 200 to 400° C. in the presence of a diluting agent, the ratio of dilution agent to fresh feed being 5-30:1. The dilution agent is preferably recycled products of the process.

However, the process proposed in EP 1 741 768 A1 still has some serious disadvantages. Thus, the amount of recycle to provide the necessary amount of diluting agent is very high. This constitutes a high hydraulic downstream load of the reactor and requires considerable revamp of existing units in order to provide the required enlarged reactor volume. Further, EP 1 741 768 A1 teaches to reduce the hydrogen consumption by promoting deoxygenation through decarb-reactions (formation of CO and $CO_2$ from carboxylic oxygen) through suitable selection of the hydrotreatment catalyst. However, such deoxygenation of the triglycerides results in loss of valuable paraffin product, deactivation of catalyst due to the inhibiting effect of CO and high corrosiveness due to the presence of $CO_2$.

Moreover, it is known that sulfide catalysts are active in respect of the following hydrotreatment reactions: hydrodesullfurization, hydrodenitrogenation, hydrodeoxygenation and hydrometallation.

Numerous writings deal with their potential in the deoxygenation reactions used for the catalytic conversion of bioliquid (originating from oleaginous materials or lignocellulose) into fuel. In particular, Senol et al (Applied Catalysis A: General vol. 326, 2007, p. 236-244) have studied the conversion of a molecule of ester model type, representative of the hydrophilic function (ester group) and lipophilic function (alkyl chain) of triglycerides present in vegetable oils, in the presence of the sulfur catalysts CoMo or NiMo/Al2O3.

BRIEF DESCRIPTION OF INVENTION

Unlike catalysts with a reduced metal base, the use of solids based on transition metal sulfides permits the production of paraffins from ester type molecule by way of two reaction methods:
  hydrodeoxygenation, resulting in the formation of water by consumption of hydrogen and the formation of hydrocarbons containing a number of carbon atoms (Cn) equal to that of the initial fatty acid chains;
  decarboxylation/decarbonylation, resulting in the formation of oxides of carbon (carbon monoxide and carbon dioxide: CO and CO2) and to the formation of hydrocarbons containing one fewer carbon atoms (Cn−1) than the initial fatty acid chains.

Therefore it is the object of the present invention to provide a process using less recycle, requiring less revamp of existing units, minimizing corrosion caused by free fatty acids and/or essentially avoiding losses of valuable paraffinic product and the other above-mentioned disadvantages due to deoxygenation of triglycerides through decarb-reactions.

It is another object of the present invention to maximize the base gas oil and/or kerosene yield and to promote the hydrodeoxygenation mechanism described above). The choice of hydrogenation catalyst and the operating conditions are thus aimed at orientating the selectivity to benefit hydrodeoxygenation against Decarboxylation/decarbonylation while also aiming to limit hydrogen consumption to strictly that which is necessary, and in particular that which would result from unwanted reactions such as methanation.

It has thus been shown that it is possible to control the selectivity of hydrodeoxygenation reactions of feeds derived from renewable sources as a function of the nature of the active phase and more particularly as a function of the atomic ratio of the metal (or metals) from group VIII to the metal (or metals) from group VIB of said active phase.

Introducing nickel into a catalyst based on molybdenum sulphide in a process for hydrodeoxygenation of feeds derived from renewable sources has a general tendency to favour reactions known as decarboxylation/decarbonylation reactions even if the reaction for transformation of the vegetable oils by hydrodeoxygenation remains in the majority.

However, surprisingly, the Applicant has discovered that using an atomic ratio of metal (or metals) from group VIII to metal (or metals) from group VIB for said active phase and in particular to use a suitable Ni/Mo atomic ratio can control and enhance the selectivity for hydrodeoxygenation reactions and hence limit decarboxylation/decarbonylation reactions and thus limit the disadvantages caused by the formation of oxides of carbon.

Thus, the catalyst employed in at least the first catalyst bed of the fixed bed reactor system of the process of the invention comprises an active phase constituted by at least one element from group VIB and at least one element from group VIII, said elements being in the sulphide form and the atomic ratio of metal (or metals) from group VIII to metal (or metals) from group VIB being strictly more than 0 and less than 0.095.

Accordingly the invention is directed to a process for the continuous hydrogenation of triglyceride containing raw materials like vegetable oils to produce diesel and/or kerosene fraction in a fixed bed reactor system having several catalyst beds comprising in at least the first catalyst bed a specific hydrogenation catalyst as defined in claim 1. The sub-claims are directed to preferred embodiments of the invention, while details and advantages of the invention will become apparent from the following description.

In the following the invention will be described with reference to FIG. 1 which shows a process scheme suitable for carrying out the invention.

DETAILED DESCRIPTION OF INVENTION

In the process according to the invention the triglyceride containing raw material, hydrogen containing gas and diluting agent are passed together through the catalyst beds of the reactor system at hydrogenation conditions, which beds are arranged in series. The triglyceride containing raw material can be any vegetable and animal oil or fat. Such materials are for example disclosed in EP 1 741 768 A1, which disclosure is included by reference. Well suited are for example sunflower oil, olive oil, peanut oil, coconut oil and beef tallow, while vegetable oils and fats like Jatropha oil, palm oil, soybean oil and rapeseed oil are preferred.

The hydrogen containing gas can consist of pure hydrogen or comprise further components which preferably are inert, which means that they do not react with the trigylceride containing raw material under the conditions of the process according to the invention. Typically, such hydrogen containing gases are produced from steam reformers as well as catalytic reformers. In practice suitable gases may contain 75 to 95 vol. % hydrogen, the balance being hydrocarbons like methane, ethane, propane and butane. Hydrogen is used in excess (e.g. at least 50%, preferably 75 to 400% and even more preferred 100 to 300%, like 150%) of the theoretical hydrogen consumption and its amount is controlled by the hydrogen partial pressure, which is preferably in the range of 10 to 80 bar.

Except for the start-up phase the diluting agent is the product from the process according to the invention.

For the first catalyst bed, the diluting agent is the specific fraction of the hydrogenation product obtained by the present process and recycled to the reactor inlet at the first catalyst bed and is referred to as added diluting agent.

For the catalyst beds following the first catalyst bed, the term diluting agent comprises the hydrogenation product formed in every catalyst bed as well as the specific fraction thereof as defined above, which is recycled to the reactor inlet at the first catalyst bed and is referred to as added diluting agent.

During start-up any suitable hydrocarbon, e.g. light gas oil, can be used as added diluting agent until enough hydrogenation product is available for recycle to the reactor inlet at the first catalyst bed.

Referring to FIG. 1, the raw material feed (here vegetable oil) is supplied through line 1, while the hydrogen containing gas is supplied through line 2. Both streams are divided into different partial streams ($F_1, F_2 \ldots F_n$ and $H_1, H_2 \ldots H_n$) and the smallest partial feed stream ($F_1$) is mixed with the smallest partial stream of hydrogen containing gas ($H_1$), the next larger partial feed stream ($F_2$) is mixed with the next larger partial stream of hydrogen containing gas $H_2$ and so on. The so obtained partial mixed streams are passed to one catalyst bed respectively such that the smallest partial mixed stream ($F_1+H_1$) is passed to the first catalyst bed (3) at the top of the fixed bed reactor system, the next larger partial mixed stream ($F_2+H_2$) is passed to the second catalyst bed (4), and so on so that the largest partial mixed stream ($F_5+H_5$) is passed to the last catalyst bed (7) at the bottom of the fixed bed reactor system.

Before the first partial mixed stream ($F_1+H_1$) enters the first catalyst bed (3) it is mixed with added diluting agent, the weight ratio of the diluting agent to raw material feed entering the first catalytic bed (F1) and not exceeding 4:1, being on the first catalytic bed, the weight ratio of the added diluting agent to F1.

Similarly, the further partial mixed streams (F2+H2; F3+H3; etc.) are mixed with the components (hydrogenation product, unreacted hydrogen containing gas, added diluting agent) from the previous catalyst bed in mixing zones between the catalyst beds of the fixed bed reactor system.

Therefore, the weight ratio of the diluting agent to raw material feed which is essentially the same at the entrance of all catalyst beds and does not exceed 4:1, is the weight ratio of the added diluting agent already defined and the hydrogenation product formed in the previous catalyst bed(s) to the raw material fresh feed (Fn) entering the concerned catalyst bed.

The weight ratio "diluting agent to partial raw material feed" as defined in claim 1 can also be referred to as a local weight recycle ratio.

For the first catalyst bed, the "diluting agent to raw material feed" i.e. the local weight recycle ratio can be expressed on the first catalyst bed, as the weight ratio of the added diluting agent (recycle hydrogenation product to the first catalytic bed)/F1 (fresh feed entering the first catalytic bed).

The weight ratio "diluting agent to raw material feed" on the second catalyst bed also called the local weight recycle ratio for the second catalyst bed, is the weight ratio of the (added diluting agent+the hydrogenation product formed in the first catalyst bed)/F2 (fresh feed entering the second catalytic bed).

The weight ratio "diluting agent to raw material feed" on the third catalyst bed also called the local weight recycle ratio for the third catalyst bed, is the weight ratio of the (added diluting agent+the hydrogenation product formed in the first and in the second catalyst bed)/F3 (fresh feed entering the third catalytic bed).

And so on . . . .

Preferably, the partial feed streams and the corresponding partial streams of hydrogen containing gas are all mixed at the same ratio of standard cubic meter of gas to cubic meter of raw material feed.

Preferably, each partial raw material feed stream is mixed with the corresponding partial stream of hydrogen containing gas to form a partial mixed stream ($F_1+H_1$, $F_2+H_2$ etc.) before entering the reactor system.

Alternatively, but less preferred, the partial feed streams and the corresponding partial streams of hydrogen containing gas are fed directly to mixing zones before the first catalyst bed and between the catalyst beds of the fixed bed reactor system without prior mixing.

The temperature of the raw material feed stream and the partial feed streams is less than 80° C., but high enough to allow suitable transport of the raw material feed to the reactor system, i.e. the viscosity of the raw material must be appropriate. Similarly the temperature of the hydrogen containing gas is as low as reasonable under practical aspects since low hydrogen temperatures are advantageous with respect to quenching the hydrogenation product leaving the catalyst beds and also with respect to the amount of added diluting agent required at the inlet of the first catalyst bed. However, since the hydrogen has to be compressed to the desired pressure in the reactor system which leads to an increased temperature, the compressed hydrogen is often cooled to a suitable temperature. In practice the hydrogen temperature should not exceed 110° C. and mostly is within the range of 40 to 100° C., like 50° C.

The temperature of the partial mixed stream introduced at the reactor inlet at the first catalyst bed is further adjusted with added diluting agent, which is a specific fraction of the hydrogenation product obtained by the present process. It is recovered from the reactor exit product mixture by separation in one or two steps without controlled pressure reduction. In the case of a separation in two steps, it is recovered from the reactor exit product mixture by separation in two steps without controlled pressure reduction at 145 to 280° C. (high temperature separator 8) and 15 to 60° C. (low temperature separator 9). This adjustment of the temperature at the reactor inlet is supported by heat exchanger (10), if required or desirable.

In a preferred embodiment the condensate of the specific fraction obtained from the second separation step is expanded in degassing vessel (12) before it is recycled to the reactor inlet at the first catalyst bed.

The temperature at the reactor inlet at the first catalyst bed should be adjusted so that the temperature at the outlet of the first catalyst bed is preferably not higher than 280° C. A suitable temperature at the reactor inlet at the first catalyst bed may be for example 200° C., which temperature due to the hydrogenation reaction rises to for example 250° C. at the outlet of the first catalyst bed. The hydrogenation of the raw material shall be essentially complete in the first bed and also in the following beds.

To the hydrogenation product leaving the first catalyst bed (3) the second partial mixed stream of raw material and hydrogen containing gas ($F_2+H_2$) is added in such an amount that the weight ratio of diluting agent to raw material feed is essentially the same as that at the entrance of the first catalyst bed (3). If said ratio is for example 4:1 at the entrance of the first catalyst bed (3), then the amount of fresh raw material feed ($F_2$) introduced by the second partial mixed stream ($F_2+H_2$) must be larger by a factor of 1.25 than the amount of raw material feed ($F_1$) introduced by the partial mixed stream ($F_1+H_1$) at the entrance of the first catalyst bed (3) so that the weight ratio of diluting agent (added diluting agent and diluting agent formed in the first catalyst bed) is again 4:1. Similarly, it is preferred that the amount of hydrogen ($H_2$) provided by the second partial mixed stream ($F_2+H_2$) is by a factor of 1.25 larger than the amount of hydrogen provided by the first partial mixed stream ($F_1+H_1$) in order to maintain the same hydrogen excess in the second catalyst bed (4) as in the first catalyst bed (3).

By the addition of the second partial mixed stream ($F_2+H_2$) to the hydrogenation product exiting the first catalyst bed (3) the temperature of the latter is reduced so that the newly formed mixture entering the second catalyst bed (4) has an acceptable lower temperature, e.g. 200° C., so that the reaction conditions in catalyst beds (3) and (4) are preferably essentially the same.

The hydrogenation product leaving the second catalyst bed (4) is mixed with the third partial mixed stream ($F_3+H_3$), the amount of which is by the same factor, e.g. 1.25, larger than the preceding partial mixed stream ($F_2+H_2$), i.e. the amount of fresh raw material feed ($F_3$) added through the third partial mixed stream ($F_3+H_3$) is by the same factor, e.g. 1.25, larger than the amount of fresh raw material feed ($F_2$) introduced by the second partial mixed stream ($F_2+H_2$). The same preferably applies to the amount of hydrogen ($H_3$) introduced by the third partial mixed stream ($F_3+H_3$) in order to maintain the same hydrogen excess in the third catalyst bed (5) as in the first and the second catalyst beds (3, 4).

The mixture of the hydrogenation product leaving the second catalyst bed (4) and the third mixed stream ($F_3+H_3$) is then introduced into the third catalyst bed (5).

The described procedure is repeated with every hydrogenation product leaving the following catalyst beds before entering the next catalyst bed.

In order to improve the temperature control the valves regulating the partial streams of raw material and hydrogen containing gas can be actuated by the temperature values at the catalyst bed inlets and outlets so as to adapt the partial streams of raw material feed and hydrogen containing gas as well as the stream of added diluting agent during operation in such a manner that the desired temperatures at the entrance of the catalyst beds and in the catalyst beds are maintained. This is exemplified by the dotted lines in FIG. 1. Furthermore, temperature control can be influenced by varying the temperature of the raw material feed and the hydrogen containing gas fed to the reactor system (see above).

The hydrogenation product leaving the last catalyst bed (7) is removed through line 11 and passed to the above described separation steps. The part of the hydrogenation product which is not recycled for addition to the first partial mixed stream can be subjected to further processing, like isomerization or hydrocracking as well as blending with refinery components.

From the above follows that diluting agent is only added to the first partial mixed stream entering the reactor inlet and passing through the first catalyst bed. Between the catalyst beds no further diluting agent is added. Preferably the weight ratio of added diluting agent to total raw material feed also referred as global weight recycle ratio, is less than 1, more preferred less than 0.5, even more preferred less than 0.4 and even more preferred less than 0.2 (e.g. about 0.4 or about 0.2.

It is preferred that the partial feed streams and the partial streams of hydrogen containing gas are all mixed at the same ratio of standard cubic meter of gas to cubic meter of raw material feed. Similarly, it is preferred that the amount of partial mixed streams to the second and the following catalyst beds is controlled so as to adjust the temperature at the inlet of every catalyst bed to essentially the same temperature as that at the reactor inlet at the first catalyst bed.

The reactor system suitable for carrying out the process according to the invention may comprise any suitable number of catalyst beds. Usually it comprises more than 3, preferably more than 4, and in particular more than 5, but less than 20, preferably less than 15 and in particular less than 10 catalyst beds. In other words n is preferably 4 to 19, more preferred 5 to 14 and particularly preferred 6 to 9.

According to the invention, a hydrogenation bulk or supported catalyst comprising an active phase constituted by at least one element from group VIB and at least one element from group VIII, said elements being in the sulphide form, and the atomic ratio of the metal (or metals) from group VIII to the metal (or metals) from group VIB being strictly more than 0 and less than 0.095, is used in at least the first catalyst bed of the fixed bed reactor system.

The term "active phase" means the phase containing the element or elements from the groups of metals in the sulfide form; in this case the active phase of the catalyst of the invention is constituted by at least one sulphide element from group VIB and at least one sulfide element from group VIII.

In accordance with the present invention, the catalyst used in the process of the invention may be supported, i.e. it comprises an amorphous mineral support selected from the group formed by alumina, silica, silica-aluminas, magnesia, clays and mixtures of at least two of these minerals and said support is preferably alumina. This support may also advantageously include other compounds, such as oxides selected from the group formed by boron oxide, zirconia, titanium oxide and phosphoric anhydride, for example.

Preferably, the amorphous mineral support is constituted by alumina only, and, very preferably, by η-, δ- or γ-alumina alone. Thus, in this preferred embodiment, said support does not contain any other compound and is constituted by 100% alumina.

In accordance with the present invention, said catalyst used in the process of the invention may alternatively be in the bulk form, i.e. without a support.

In accordance with the process of the invention, the active phase of said catalyst in the supported or bulk form is constituted by at least one element from group VIB and at least one element from group VIII, said element from group VIB being selected from molybdenum and tungsten; preferably, said element from group VIB is molybdenum; and said element from group VIII is selected from nickel and cobalt; preferably, said element from group VIII is nickel.

In accordance with the process of the invention, the atomic ratio of the metal (or metals) from group VIII to the metal (or metals) from group VIB is strictly more than 0 and less than 0.095, preferably in the range 0.01 to 0.08, more preferably in the range 0.01 to 0.05 and highly preferably in the range 0.01 to 0.03.

Preferably, the metal from group VIB is molybdenum and the metal from group VIII is nickel and the atomic ratio of the metal from group VIII to the metal from group VIB, i.e. the atomic ratio Ni/Mo, is strictly more than 0 and less than 0.095, preferably in the range 0.01 to 0.08, more preferably in the range 0.01 to 0.05 and highly preferably in the range 0.01 to 0.03.

In the case in which said catalyst is in the supported form, the quantity of the oxide of the element VIB is advantageously in the range 1% to 30% by weight with respect to the total catalyst mass, preferably in the range 10% to 25% by weight, more preferably in the range 15% to 25% by weight and still more preferably in the range 17% to 23% by weight, and the quantity of the oxide of the element from group VIII is advantageously strictly more than 0% and less than 1.5% by weight with respect to the total catalyst mass, preferably in the range 0.05% to 1.1% by weight, more preferably in the range 0.07% to 0.65% by weight and still more preferably in the range 0.08% to 0.36% by weight.

In the context of the invention, the minimum value of the atomic ratio Ni/Mo of 0.01 for a molybdenum oxide content of 1% by weight, corresponds to a nickel content of 50 ppm by weight, detectable by the usual techniques of elemental analysis by ICP (inductively coupled plasma), said nickel detection limit being of the order of ppm.

In the case in which said catalyst is in the bulk form, the quantity of the oxide of elements from group VIB and VIII are defined by the atomic ratios of the metal (or metals) from group VIII to the metal (or metals) from group VIB as defined in accordance with the invention.

For an atomic ratio of the metal (or metals) from group VIII to the metal (or metals) from group VIB of strictly more than 0 and less than 0.095, the quantity of element from group VIB is advantageously more than 95.3% and strictly less than 100% by weight as the oxide equivalent of the element from group VIB and the quantity of the element from group VIII is advantageously strictly more than 0 and less than 4.7% by weight as the oxide equivalent of the element from group VIII.

For an atomic ratio of the metal (or metals) from group VIII to the metal (or metals) from group VIB in the range 0.01 to 0.08, the quantity of element from group VIB is advantageously in the range 96% to 99.4% by weight as the oxide equivalent of the element from group VIB and the quantity of the element from group VIII is advantageously in the range 0.6% to 4% by weight as the oxide equivalent of the element from group VIII. For an atomic ratio of the metal (or metals) from group VIII to the metal (or metals) from group VIB in the range 0.01 to 0.05, the quantity of element from group VIB is advantageously in the range 97.4% to 99.4% by weight as the oxide equivalent of the element from group VIB and the quantity of the element from group VIII is advantageously in the range 0.6% to 2.6% by weight as the oxide equivalent of the element from group VIII. For an atomic ratio of the metal (or metals) from group VIII to the metal (or metals) from group VIB in the range 0.01 to 0.03, the quantity of element from group VIB is advantageously in the range 98.4% to 99.4% by weight as the oxide equivalent of the element from group VIB and the quantity of the element from group VIII is advantageously in the range 0.6% to 1.6% by weight as the oxide equivalent of the element from group VIII. The catalyst of the invention may also advantageously contain at least one doping element selected from phosphorus, fluorine and boron; preferably, the doping element is phosphorus, in order to attain a high conversion rate whilst maintaining a reaction selectivity for the hydrodeoxygenation method.

If said catalyst is in supported form, said doping element is advantageously deposited on the support. It is also advantageously possible to deposit silicon on the support, alone or with the phosphorus and/or boron and/or fluorine.

If a supported catalyst is used, the hydrogenating function can be introduced onto said catalyst by any method known to the skilled person, such as, for example, co mixing, dry impregnation, etc. . . .

If said catalyst is a bulk catalyst, said doping element is advantageously deposited on the active phase.

If said catalyst is a bulk catalyst, it is obtained from any of the synthesis methods known to the skilled person, such as direct sulfuration of oxide precursors and thermal decomposition of metal thiosalt.

In the case in which said catalyst is in the bulk form or in the supported form the content of doping element, said doping element preferably being phosphorus, is advantageously strictly above 0.5% and less than 8% by weight of $P_2O_5$ oxide in relation to the total mass of catalyst, and, preferably, above 1% and less than 8%, and, very preferably, above 3% and less than 8% by weight.

Said doping element is not part of the active phase as defined above but these elements have an indirect effect on the active phase and particularly on catalytic activity: they allow better dispersion of the sulfur-containing active phase, and an increase in acidity of the catalyst favourable for hydrotreatment reactions.

The use of the catalyst described above in at least the first catalyst bed of the process of the invention means that the formation of oxides of carbon can be limited for the reasons given above, by limiting decarboxylation/decarbonylation reactions.

It has thus been shown that it is possible to control the selectivity of hydrodeoxygenation reactions of feeds derived from renewable sources and to minimize the decarboxylation/decarbonylation reactions as a function of the nature of the active phase and more particularly as a function of the atomic ratio of the metal (or metals) from group VIII to the metal (or metals) from group VIB of said active phase.

Surprisingly, the use of a catalyst having an atomic ratio of metal (or metals) from group VIII to metal (or metals) from group VIB of said active phase and in particular the use of a Ni/Mo atomic ratio strictly more than 0 and less than 0.095 means that the selectivity for hydrodeoxygenation reactions can be controlled and enhanced; thus, the decarboxylation/decarbonylation reactions can be limited and thus the problems caused by the formation of oxides of carbon are limited.

Further, the increase in the quantity of the element from group VIII and in particular nickel tends to favour the decarboxylation/decarbonylation reaction even though the hydrodeoxygenation remains the major reaction. Thus, it has been demonstrated that the hydrodeoxygenation selectivity is optimized, in particular for values of the atomic ratio Ni/Mo in the range 0.01 to 0.03.

In a first embodiment of the present invention, the hydrogenation catalyst according to the invention is used only in the first catalyst bed of the fixed bed reactor system.

In this first embodiment, another hydrogenation catalyst comprising at least one element from group VIB and at least one element from group VIII and at least one element from group VIII and at least one refractory oxide support selected from alumina and silica alumina, said element from group VIB being selected from molybdenum and tungsten; preferably, said element from group VIB is molybdenum; and said element from group VIII is selected from nickel and cobalt; preferably, said element from group VIII is nickel, said elements being in the sulfide form, is preferably used in the catalyst beds following the first one, said hydrogenation catalyst displaying an atomic ratio of the metal (or metals) from group VIII to the metal (or metals) from group VIB between 0.1 and 1.

In another embodiment of the present invention, the hydrogenation catalyst according to the invention is used in the first catalyst bed and in one or more successive catalyst beds following the first one.

In this another embodiment, another hydrogenation catalyst comprising at least one element from group VIB and at least one element from group VIII, said element from group VIB being selected from molybdenum and tungsten; preferably, said element from group VIB is molybdenum; and said element from group VIII is selected from nickel and cobalt; preferably, said element from group VIII is nickel, said elements being in the sulfide form, is preferably used in the following catalyst beds, said hydrogenation catalyst displaying an atomic ratio of the metal (or metals) from group VIII to the metal (or metals) from group VIB between 0.1 and 1.

In a preferred embodiment of the present invention, the hydrogenation catalyst according to the invention is used in every catalyst beds of the reactor system of the present invention.

Use of the catalyst according to the invention in at least the first catalyst bed of the process of the invention makes it possible to limit the formation of carbon oxide by limiting decarboxylation/decarbonylation reactions.

In the context of the invention, it is thus possible to maintain a global conversion of the charge triglyceride containing raw materials, i.e. conversion by hydrodeoxygenation and by a mix of decarboxylation/decarbonylation, which is advantageously above or equal to 90%, and, preferably, global conversion of the charge equal to 100%, while maximizing the yield of hydrodeoxygenation product, i.e. of deoxygenated products which advantageously remains 90% or higher, preferably 95% or higher and more preferably 96% or higher.

In accordance with the invention, conversion of the feed by decarboxylation/decarbonylation or yield of decarboxylation/decarbonylation product of the charge originating from renewable sources is limited to at most 10%, preferably limited to at most 5% and more preferably limited to at most 4%.

The hydrodeoxygenation reaction results in the formation of water by consumption of hydrogen and to the formation of hydrocarbons with a number of carbon atoms equal to that of the initial fatty acid chains. The feeds considered in the present invention mainly contain even-numbered hydrocarbon compounds. This is a characteristic which is well known in vegetable oils, oils derived from algae and fish oils which are principally composed of triglycerides the hydrocarbon chains of which contain an even number of carbon atoms, generally from 8 to 24. Certain fats of animal origin may have hydrocarbon chains containing 17 carbon atoms amounting to a few percent (generally 2% to 3% by weight) (reference: Biodiesel, the comprehensive handbook, by Martin Mittelbach and Claudia Remschmidt). The effluent derived from the hydrodeoxygenation process of the invention thus comprises hydrocarbon compounds with a number of carbon atoms (Cn) (n being an even number) which is equal to that of the initial fatty acid chains, which is in the vast majority compared with hydrocarbon compounds comprising one fewer carbon atoms (Cn−1) (n−1 being odd, by definition) compared with the initial fatty acid chains, which are obtained by decarbonylation/decarboxylation reactions. The selectivity for the hydrodeoxygenation pathway is demonstrated by measuring the total yield of hydrocarbon compounds with a number of carbon atoms (Cn) equal to that of the initial fatty acid chains and the total yield of hydrocarbon compounds comprising one fewer carbon atoms (Cn−1) compared with the initial fatty acid chains in the upgradable fuel fraction. The yields of hydrocarbons (Cn) containing an even number of carbon atoms and (Cn−1) containing an odd number of carbon atoms providing access to the selectivity of the reaction for the hydrodeoxygenation reaction are obtained by gas chromatographic analysis of the liquid effluents from the reaction which can be upgraded to fuel. The technique for measurement by gas chromatographic analysis is a method which is known to the skilled person.

Unless specified otherwise, the process according to the invention is carried out at hydrogenation conditions generally known in the art, see e.g. EP 1 741 768 A1. Accordingly the pressure can be within the known ranges of 20 to 150 bar, preferably between 50 and 100 bar.

As stated above, hydrogen is used in excess. In the process according to the invention it is preferred that the ratio of hydrogen to raw material feed is in the range of 100 to 1,000 $Nm^3/m^3$.

To avoid side reactions, in particular decarbonylation/decarboxylation, the hydrogenation preferably takes place at temperatures of 145 to 280° C. Since during hydrogenation the temperature increases, the temperatures at the entrances of the catalyst beds have to be controlled so that the temperature of the reaction mixture exiting the catalyst bed is not too high and preferably not above 280° C. Preferably the temperature at the entrances of the catalyst beds should not be higher than 250° C., more preferably said temperature is 220° C. or less.

To run the process according to the invention optimally the space velocity (LHSV) of the raw material feed in each bed should be in the range from 0.1 to 5 $m^3/m^3$ catalyst/h, while the linear velocity of the liquid material should be in the range from 1 to 6 mm/s. Such low linear velocities are advantageous to achieve low pressure drop, optimal hold up and consequently maximum target conversion, and are not achieved with high recycle ratios as disclosed in the prior art.

The volume of the catalyst beds may increase in flow direction in order to secure essentially the same space velocity for each fresh raw material feed stream ($F_1$ to $F_n$). Thus, it is preferred that the space velocity based on the fresh raw material introduced into each catalyst bed is about the same in all catalyst beds and is within the above stated range. However, the linear velocity of the raw material feed in each catalyst bed is different and increases from bed to bed in downstream direction, but should be in the above stated range in all beds.

For processes like the one according to the invention usually trickle bed reactors are used. The reactants (fresh feed and hydrogen) are passed through the reactor in cocurrent flow from the top to the bottom of the reactor. Such reactors are well known and are preferably used in the present invention (see e.g. U.S. Pat. No. 7,070,745 B2, in particular column 1; Andreas Schulze "Entwicklung der Strukturen der Erdölraffinerien in Deutschland, Jun. 27, 2005, scheme "Hydroraffination (Hydrotreating)").

It is essential in the process according to the invention that each partial stream of raw material feed following in downstream direction being that much larger than the preceding one that the weight ratio of diluting agent to raw material feed is essentially the same at the entrance of all catalyst beds and does not exceed 4:1. Thus, it is preferred that the weight ratio of diluting agent to raw material feed at the reactor entrance is 4:1 or less and each partial stream of fresh raw material feed is by a factor of 1.25 or more larger than the previous partial stream.

Preferably also each partial stream of hydrogen containing gas following in downstream direction is larger than the preceding one by essentially the same factor as the corresponding partial streams of raw material feed with which they are mixed. Accordingly it is preferred that in the embodiment mentioned above also each partial stream of hydrogen containing gas is by a factor of 1.25 or more larger than the previous partial stream.

The process according to the invention provides important benefits in that only a minimum of recycle based on the total fresh raw material is required. This in turn results in a low downstream hydraulic load of the reactor and allows the use of existing units without considerable revamp. In comparison, temperature control in the prior art like in the process disclosed in EP 1 741 768 A1 requires high amounts of recycle which in turn means high investments and high operation costs. Furthermore, the high dilution is disadvantageous with respect to the required quick transport of hydrogen to the catalytic centers of the hydrogenation catalyst.

Another advantage of the process according to the invention is its high flexibility which means that practically all available triglyceride containing raw materials can be processed despite the fact that the exothermy of suitable raw materials like oils and fats varies considerably.

Furthermore, the process according to the invention is flexible insofar as it allows coprocessing with mineral oils without problems, e.g. straight run fractions like heavy gasoline, kerosene, light gas oil and the like. Since such mineral oil constituents also have a "diluting effect" it is often possible to further reduce the amount of recycle.

Preferably, the stream of mineral oil is injected together with the triglyceride containing raw material stream.

For removing sulfur and optionally also nitrogen from the mineral oil constituents a second reactor is positioned between the above described fixed bed reactor system and the high temperature separator 8 and the low temperature separator 9, which reactor operates at for this purpose required higher temperatures above 280° C., e.g. 310 to 330° C. If the product obtained by the process of the present invention shall be subjected to further processing like isomerization with noble metal catalysts sensible to nitrogen, then such a second reactor is useful even if only vegetable oil is processed in order to remove the low amount of nitrogen containing molecules (5 to 10 ppm) which are contained in vegetable oils and are not removed at the low temperatures in the first fixed bed reactor system for the continuous hydrogenation according to the present invention.

Coprocessing with mineral oils is of particular importance when carrying out the process according to the present invention in existing units since it allows capacity utilization sharing corresponding to the specific requirements of a refinery. Thus, if an existing unit cannot be completely reserved for processing of vegetable oils, its capacity can be used partly for hydrotreating of mineral oil fractions and partly for the hydrogenation of vegetable oils in accordance with the present invention. In this manner mineral oil constituents in an amount of up to ⅓ of the raw material feed stream can be used and hydrotreated together with the vegetable oil constituents.

In the upstream region the temperature of the triglyceride containing raw material is low so that there is no corrosion by free fatty acids. This allows the use of existing equipment since stainless steel is not required.

In the process according to the invention and thanks to the combination of operating conditions applied to the entrance of catalyst bed and to the use of a specific hydrogenation catalyst, a maximum yield to valuable paraffin product is achieved and there are practically no C-losses by side decarbonylation/decarboxylation reactions forming CO and $CO_2$. Thus, also downstream corrosion is minimized.

Due to the comparatively low temperatures used throughout the process and due to the fact that undesirable temperature peaks are avoided, the invention provides an extremely mild conversion of the triglyceride containing raw material without side reactions impairing the quality of the liquid product and without catalyst damage.

BRIEF DESCRIPTION OF THE DRAWING

FIG. 1 is a schematic representation of a process of the invention.

EXAMPLE 1

A rapeseed oil (density at 15° C.=920 kg/m3) was used at 1.0 LHSV based on fresh feed, 5 MPa and 900 liters $H_2$ per liter fresh feed in an adiabatic reactor with 3 catalyst beds which contained the same catalyst NiMoPl exhibiting the composition mentioned below. The total catalytic volume is distributed in the 3 beds as follows 47 vol %/28 vol %/25 vol %.

Fatty acid composition of the rapeseed oil is given in Table 1.

TABLE 1

| Fatty acid composition (wt %) | Values |
| --- | --- |
| C14:0 | 0.1 |
| C16:0 | 5.0 |
| C16:1 | 0.3 |
| C17:0 | 0.1 |
| C17:1 | 0.1 |
| C18:0 | 1.5 |
| C18:1 | 60.1 |
| C18:2 | 20.4 |
| C18:3 | 9.6 |
| C20:0 | 0.5 |
| C20:1 | 1.2 |
| C22:0 | 0.3 |
| C22:1 | 0.2 |
| C24:0 | 0.1 |
| C24:1 | 0.2 |

The catalyst used in accordance with the invention comprises an active phase constituted by 0.22% by weight of NiO, 21% by weight of MoO3 and 5% by weight of P2O5 supported on a gamma alumina. The catalyst NiMoPl had an atomic ratio Ni/Mo equal to 0.02.

The supported catalyst was prepared by dry impregnation of oxide precursors in solution then in situ sulphurization at a temperature of 350° C. prior to the test using a straight run diesel feed added with 2% by weight of dimethyldisulphide (DMDS). After in situ sulphurization in the unit under pressure, the feed derived from a renewable source constituted by rapeseed oil described in Table 1 was sent to the reactor.

In order to maintain the catalyst in the sulfided state, 50 ppm by weight of sulphur was added to the feed in the form of DMDS. Under the reaction conditions, the DMDS was completely decomposed to form methane and H2S.

The method for preparing the catalysts does not limit the scope of the invention.

As shown in FIG. 1 the oil, which was stored above the pour point at 60° C., was without any additional heating divided into 3 partial streams $F_1$, $F_2$ and $F_3$ and mixed with partial hydrogen streams $H_1$, $H_2$ and $H_3$ in a ratio of 900 liters per 1 liter of fresh feed. The partial hydrogen streams were provided at 50° C. at a pressure slightly above the pressure of the reactor. After mixing partial stream $F_1$ with partial hydrogen stream $H_1$ a specific fraction was added as diluting agent in order to control the temperature at the reactor entrance as well as the average temperature of the first catalyst bed. The former is mainly controlled by the adjustment of the temperature of the specific fraction, while the latter is mainly controlled by the amount of the specific fraction.

The specific fraction had a temperature of 315° C. and was added to the partial mixed stream of fresh feed and hydrogen ($F_1+H_1$) in an excess of 2 based on the weight of the fresh feed. The local recycle ratio for bed 1 (added diluting agent/fresh feed sent to the inlet of bed 1) is set to the value of 2.0. The temperature at the reactor entrance was 210° C. and the average temperature in the first catalyst bed was 245° C.

The specific fraction used as diluting agent was obtained from the product mixture exiting the reactor through line (11) by separation in two steps at almost reactor exit temperature (high temperature separator 8) and 45° C. (low temperature separator 9) and by subsequent expansion of the condensate obtained at 45° C. to 5 MPa in degassing vessel (12).

By controlling the amount of the cold fresh feed/$H_2$ partial mixed streams $F_2+H_2$ and $F_3+H_3$ to each subsequent catalyst bed again the same inlet temperature of 210° C. was adjusted for each bed. After all the split of the total volume of fresh feed was about as follows: 25% $F_1$, 30% $F_2$, 45% $F_3$.

It was surprising that this operation of the reactor allowed the adjustment of the average temperature at 245±1° C. for all 3 catalyst beds so that the hydrogenation conditions were approximately the same in all beds. This was also achieved when using another fresh feed with a different composition, which released a considerably different reaction heat due to the different saturation. By varying the proportions of the components, the same temperature could be adjusted in all catalyst beds.

During the test period of more than 1,000 hours there was no indication of activity or yield loss.

The average yield structure is summarized in Table 2. It has been obtained thanks to an accurate material balance, calculated as follows:
- the weight of oil processed during a given period is measured, by measuring the weight of oil injected during the period of time.
- the weight of products at the exit is determined (water and hydrocarbons), while the amount of gases is calculated using the total volume of gas and gas composition from on line GC analysis.

hydrogen consumption is calculated using the hydrogen content in the feed and in the products (gas and liquid).

TABLE 2

| | | |
|---|---|---|
| Global conversion (wt %) | | 100.0 |
| Raffinate (Total hydrocarbons) (wt % on feed) | | 85.6 |
| chem. $H_2$ | | |
| consumption | wt. % on feed | 3.5 |
| $C_4$- | wt. % on feed | 5.5 |
| CO | wt. % on feed | 0.15 |
| $CO_2$ | wt. % on feed | 0.35 |
| $H_2O$ | wt. % on feed | 11.9 |
| Yield of HDO in liquid hydrocarbon (wt %) | | 96.8 |
| Yield of DCO in liquid hydrocarbon (wt %) | | 3.2 |

Yield of HDO is the content in the liquid hydrocarbons formed by the process, of hydrocarbons having an even carbon number in the range C14-C24, expressed in wt % of the total hydrocarbon product. Yield of DCO is the content in the liquid hydrocarbons formed by the process, of hydrocarbons having an odd carbon number in the range C15-C23, expressed in wt % of the total hydrocarbon product. Both yields are determined using GC analysis of the liquid hydrocarbons obtained by the process.

At the exit of the hydrotreatment section, the feed is totally converted, i.e. HDO is totally achieved. Moreover, a high selectivity is achieved for the hydrodeoxygenation reactions, since the hydrocarbon product is composed of 96.8 wt % of even hydrocarbons (C14-C24) and only 3.2 wt % of odd hydrocarbons (C15-C23), the latter being formed following decarb-reaction route.

The above test results demonstrate that the process according to the invention is capable of stable operation in a very economic manner without excess burden on the plant. The process according to the invention allows to favour hydrogenation route rather than decarboxylation route, which is leading to a maximum yield in valuable products, while avoiding undesired side reactions such as CO and $CO_2$ formation.

It is particularly surprising that this result is achieved with a comparatively low amount of specific fraction which serves as diluting agent or reaction controller. The global recycle ratio which is reached is 0.54.

At least a part of the raffinate which is not recycled is subjected to hydroisomerisation step in presence of a well known nickel tungsten on silica alumina hydroisomerisation catalyst at 340° C., 0.5 MPa, a vvh set to 1 h−1 and at a hydrogen flow rate corresponding to a hydrogen/hydrocarbons volume ratio of 700 Nl/l/h.

After hydroisomerization section, the resulting effluent can be separated into 3 fractions given in table 3. Main characteristics of the kerosene cut and the diesel cut are given in Table 3.

TABLE 3

| | |
|---|---|
| Characterization of jet and diesel cuts | |
| Yields(wt % on fresh feed) | |
| Naphtha (150° C.− cut) | 15.6 |
| Kerosene (150-250° C.) | 60.0 |
| Diesel (250° C.+) | 10.0 |
| Total raffinate | 85.6 |
| Characteristics of diesel cut (250° C.+) | |
| Cetane (ASTM D613) | 75 |
| Cold Filter Plugging Point (° C.) | −15 |

TABLE 3-continued

Characterization of jet and diesel cuts

| | |
|---|---|
| Sulfur (wt ppm) | 1 |
| Density 15° C. (kg/m3) | 790 |
| Aromatics (wt %) | <0.2 |
| Characteristics of kerosene cut (150-250° C.) | |
| Density (kg/m3) | 770 |
| Freezing Point (° C.) | −50 |
| Smoke Point (° C.) | 30 |
| Viscosity at −20° C. (mm2/s) | 6 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding European Procedure (Patents) Application No. 10290480.2, filed Sep. 8, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for continuous hydrogenation of raw materials comprising triglycerides in a fixed bed reactor system having multiple catalyst beds arranged in series comprising hydrogenation catalyst, the process comprises:

a) dividing a raw material feed stream having a temperature of less than 80° C. into a number of partial raw material feed streams F1 to Fn, dividing a stream of gas containing hydrogen having a temperature of less than 110° C. into the same number of partial gas containing hydrogen streams H1 to Hn, and forming n partial mixed streams by combining the partial raw material feed streams with the corresponding partial gas containing hydrogen streams, wherein n is at least 3 and equal to the number of catalyst beds in the reactor system;

b) mixing partial mixed stream (F1+H1) with a recycled fraction of a hydrogenation product from catalyst bed n to form a first mixture, wherein the weight ratio of the recycled fraction to the raw material feed stream is less than 1, and passing the first mixture to a first catalyst bed to produce hydrogenation product;

c) mixing partial mixed stream (F2+H2) and diluting agent consisting of the hydrogenation product from the preceding catalyst bed to form a second mixture and passing said mixture to a second catalyst bed to produce hydrogenation product;

d) repeating step (c) with partial mixed streams (F3+H3) to (Fn+Hn), in corresponding catalyst beds;

e) recovering hydrogenation product from catalyst bed n and separating said hydrogenation product without controlled pressure reduction; and f) recycling a fraction of said hydrogenation product from step (e) only to the first catalyst bed;

wherein:

an amount of hydrogen is added in excess of the theoretical hydrogen consumption;

each partial raw material feed stream following in downstream direction is larger than the receding stream;

a weight ratio of diluting agent to partial raw material feed stream is essentially the same in each catalyst bed and does not exceed 4:1;

temperature at the inlet of the first catalyst bed is adjusted by the recycled fraction of hydrogenation product from catalyst bed n;

the hydrogenation catalyst in the first catalyst bed is a bulk or supported NiMoP catalyst comprising an active phase consisting of nickel and molybdenum, said nickel and molybdenum being in sulfide form, and having an atomic ratio of nickel to molybdenum in the range of 0.01 to 0.03, and a quantity of phosphorus which is more than 1% and less than 8% by weight of $P_2O_5$ oxide with respect to the total catalyst mass; and the hydrogenation process is carried out at a hydrogen partial pressure in the range of 1 to 8 MPa, at a temperature in the range of 145 to 280° C., and at a liquid hourly space velocity (LHSV) of the raw material feed in each catalyst bed in the range of 0.1 to 5 $m^3/m^3$ catalyst/h.

2. The process according to claim 1, wherein the amount of hydrogen in excess is at least 50%.

3. The process according to claim 1, wherein an amount of the partial streams or the partial mixed streams passed to the second and following catalyst beds is controlled such that the temperature at the inlet of every catalyst bed is essentially the same temperature as the inlet to the first catalyst bed.

4. The process according to claim 1, wherein the reactor system comprises more than 3, but less than 20, catalyst beds.

5. The process according to claim 1, wherein the bulk or supported NiMoP hydrogenation catalyst is used only in the first catalyst bed and another hydrogenation catalyst comprising at least one element from group VIB and at least one element from group VIII, and at least one refractory oxide support selected from alumina and silica alumina, said element from group VIB being molybdenum or tungsten; and said element from group VIII being nickel or cobalt; said elements being in the sulfide form, is used in the catalyst beds following the first catalyst bed, said hydrogenation catalyst having an atomic ratio of the metal or metals from group VIII to the metal or metals from group VIB between 0.1 and 1.

6. The process according to claim 1, wherein the same hydrogenation catalyst is used in every catalyst bed of the fixed bed reactor system.

7. The process according to claim 1, wherein an amount of each partial raw material feed stream as well as each partial gas containing hydrogen stream is larger by a factor of at least 1.25 than the preceding partial streams.

8. The process according to claim 2, wherein the amount of hydrogen in excess is 75% to 400%.

9. The process according to claim 2, wherein the amount of hydrogen in excess is 100% to 300%.

10. The process according to claim 1, wherein the weight ratio of the recycled fraction to the raw material feed stream is less than 0.5.

11. The process according to claim 4, wherein the reactor system contains more than 4, but less than 15, catalyst beds.

12. The process according to claim 4, wherein the reactor system contains more than 5, but less than 10, catalyst beds.

* * * * *